Nov. 12, 1929.  W. I. BLOCK  1,735,372
TIRE DISPLAY HOLDER
Filed May 11, 1928
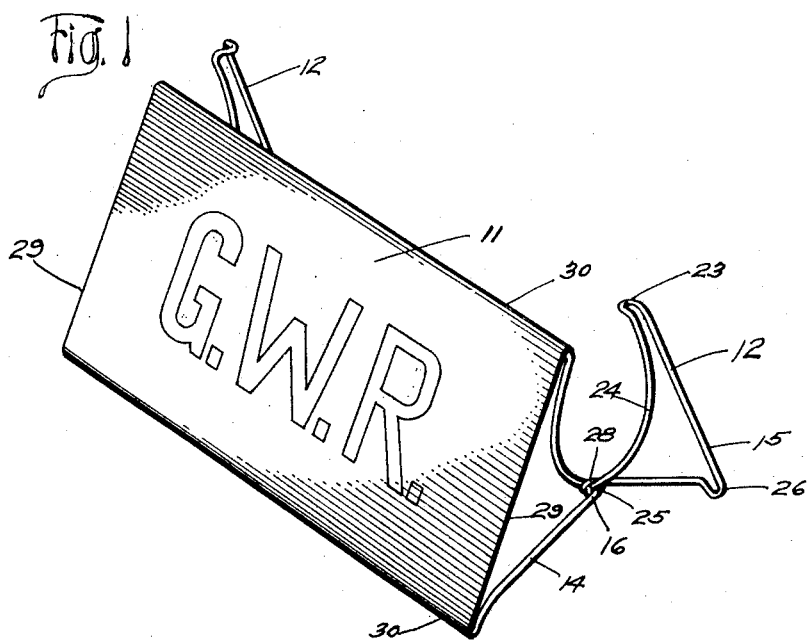
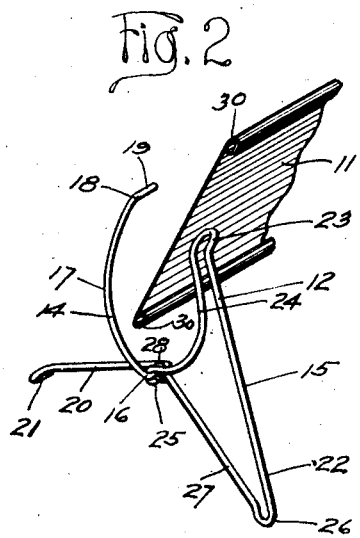
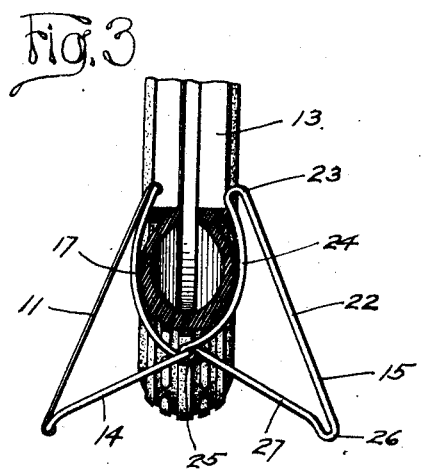
INVENTOR
William I. Block
BY John C. Carpenter
ATTORNEY Patented Nov. 12, 1929

1,735,372

UNITED STATES PATENT OFFICE

WILLIAM I. BLOCK, OF CHICAGO, ILLINOIS, ASSIGNOR TO AMERICAN CAN COMPANY, OF NEW YORK, N. Y., A CORPORATION OF NEW JERSEY

TIRE-DISPLAY HOLDER

Application filed May 11, 1928. Serial No. 277,049.

This invention relates in general to display devices, and more particularly to automobile tire display supports, racks or holders of simple sheet metal and wire construction.

A tire display holder or rack, in order to meet the keen competition in this line of manufacture, must necessarily be of very cheap and simple construction; must consist of the smallest number of parts compatible with proper functioning, and the parts composing it must be easily assembled for display and preferably also easily disassembled for packing and shipping. A tire display holder should be neat in appearance and attractive and pleasing to the eye of a prospective customer. It should also provide a sufficiently large panel for advertising the particular brand of tire to be supported and displayed and should be designed to securely and effectively hold a tire in proper position for display. The supporting parts should be interchangeable and adapted to be used in connection with a number of different display panels. All the parts should be light in weight and yet strong and durable.

My invention combines all these desirable features and advantages and many others and contributes therefore a decided improvement in this art.

Numerous other objects and advantages of the invention will be apparent as it is better understood from the following description, which, taken in connection with the accompanying drawings, discloses a preferred embodiment thereof.

Referring to the drawings:

Figure 1 is a perspective view of the wire tire holder and sheet metal display panel, fully assembled and ready to receive and hold a tire shoe for display;

Fig. 2 is a fragmental detail view showing one of the wire supports removed from the end of the panel, and Fig. 3 is an end view of the wire tire holder showing the device in use with a tire shoe in position, and partially in cross section.

To illustrate my invention, I have shown on the drawings, a preferred embodiment thereof which comprises in general a sheet metal display panel or plate 11 of substantially rectangular shape having a two-piece wire support 12 detachably connected therewith at each end thereof. When fully assembled the panel 11 and the pair of wire supports 12 are adapted to hold and support an automobile tire or shoe 13.

The two wire supports 12 are identical in construction; hence a description of one of them will suffice. Each wire support 12 comprises two members pivotally connected together, that is, a front wire member 14 which is connected with and holds the sheet metal panel 11 in proper position, and a rear wire member 15 which has parts wrapped around and hinges on a pivot provided by the front member 14.

The front wire member 14 consists of a one-piece wire of heavy gauge and strong enough to support a heavy tire without bending under its weight. This piece of wire is twisted about midway its length to form a transverse pivot 16 which divides the wire into two end sections. One of these end sections is bent transversely of the pivot 16 and is curved to form an upwardly extending semi-elliptical half jaw 17, which in turn is bent at 18 to form a transverse connecting pin 19. The other end section of the front wire member 14 is bent in a slanting, downward direction to form a substantially straight supporting leg 20, which, adjacent its extremity, is bent transversely substantially at right angles to the leg 20 to form a connecting pin 21 corresponding in length and axial direction to the pin 19. The pins 19 and 21 are arranged in the plane of the panel as will be presently more fully described.

The rear wire member 15 is also made of one piece of wire and of the same stock as the front wire member 14. It consists of a straight center part 22 which is bent at its upper end into a loop 23. The loop 23 in turn merges into a downwardly extending semi-elliptical half jaw 24. The metal of the jaw 24 is wrapped at its lower extremity around the pivot 16 to form a hinge member 25 of hook formation. The lower end of the straight central part 22 is bent into a loop to form a supporting foot 26, and the latter in turn merges into a substantially straight, upwardly slanting supporting leg 27 whose upper extremity is wrapped around the pivot 16 inwardly of the hinge members 25 to form a second hinge member 28 of hook formation.

The display panel 11 is made from a rectangular piece of sheet metal. Two opposite sides of the rectangular panel 11, preferably the long or horizontal sides, are rounded by having the marginal edges turned inwardly to form hollow beads or curls 30, which are adapted to receive the wire pins 19 and 21 of the front wire members 14 of the wire supports 12 when the panel 11 and the wire supports 12 are assembled.

It is conceivable and it is within the purview of my invention that the marginal metal of the short sides may be flanged inwardly to form hollow beads similar to the hollow beads 30 of the long sides in which case the formation of the connecting pins 19 and 21 of the front wire members 14 may be slightly changed to make them fit within the hollow beads of the short sides.

The front surface of the panel 11 is flat and smooth and may be lacquered, painted or lithographed in attractive colors and lettering to advertise the name and qualities of the tire on display.

The panel 11, when assembled with the wire supports 12, ordinarily assumes a more or less backwardly slanting position, as shown in Figure 1. It will be readily seen that the panel 11 and the pair of wire supports 12 are easily and quickly assembled by merely inserting the pins 19 and 21 of the front members 14 into the hollow beads 30 of the panel 11. These wire supports 12 are just as easily detached from the panel 11 and may be packed and shipped separately and used in connection with other panels of identical construction. The pins 19 and 21 are so spaced and arranged that they enter readily into the open ends of the beads 30 of the panel, the natural resilience of the wire facilitating this insertion.

Referring now to Fig. 3, the tire or shoe 13 is shown supported by the semi-elliptical jaws 17 and 24. The shoe 13 is substantially elliptical in cross section, as is the case in all tire shoes. The weight of the shoe tends to press against the pivot connection 16 of the front and rear members. This will spread the leg members 20 and 27 and at the same time the jaw members 17 and 24 are contracted so as to tightly grip the tire shoe around its substantially elliptical outer face or periphery and to hold it securely in upright position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a tire display holder, in combination, a sheet metal display panel and a pair of opposed wire holders detachably assembled to said panel, each of said holders comprising two wire members bent around each other and forming a pivot and a bearing therefor, whereby said wire members are pivotally connected together.

2. In a tire display holder, in combination, a sheet metal display panel and a pair of opposed wire holders detachably assembled to said panel, each of said holders comprising two wire members bent around each other and forming a pivot and a bearing therefor, whereby said wire members are pivotally connected together, one of said members being immovable relative to said panel.

3. In a tire display holder, in combination, a sheet metal display panel and a pair of opposed wire holders detachably assembled to said panel, each of said holders comprising a front wire member and a rear wire member bent around and pivotally connected with said front wire member, the latter being immovable relative to said panel.

4. In a tire display holder, in combination, a sheet metal display panel having two opposite side edges formed into hollow beads, and a pair of opposed wire holders detachably assembled with said hollow beads, each of said holders comprising two wire members pivotally connected together.

5. In a tire display holder, in combination, a sheet metal display panel having two opposite side edges formed into hollow beads, and a pair of opposed wire holders detachably assembled with said hollow beads, each of said holders comprising two wire members pivotally connected together, one of said wire members being immovable relative to said panel.

6. In a tire display holder, in combination, a rectangular sheet metal display panel having its long side edges formed into hollow beads, and a pair of opposed wire holders detachably assembled with said hollow beads, each of said holders comprising two wire members pivotally connected together.

7. In a tire display holder, in combination, a sheet metal display panel having two opposite side edges formed into hollow beads and a pair of opposed wire holders, each of said holders comprising two wire members pivotally connected together and bent to the general contour of the face of the tire to be supported and displayed, one of said members being hingedly wrapped around the other, the latter having ends adapted to engage with said hollow beads.

8. In a tire display holder, in combination, a sheet metal display panel having opposite side edges formed into hollow beads and a pair of opposed wire holders, each of said holders comprising a wire member having its ends bent to the plane of the panel and adapted to enter into the ends of said beads and a second member engaging the central portion of the first-mentioned member to clamp a tire in position.

WILLIAM I. BLOCK.